United States Patent [19]

Liesenhoff et al.

[11] Patent Number: 5,054,517
[45] Date of Patent: Oct. 8, 1991

[54] ONE-WAY RESTRICTOR

[75] Inventors: Thomas Liesenhoff, Hannover;
Hans-Friedrich Meyer, Gehrden;
Manfred Schmitz, Garbsen;
Ernst-August Meyer, Algermissen;
Rudolf Möller, Gehrden, all of Fed.
Rep. of Germany

[73] Assignee: WABCO Westinghouse
Steuerungstechnik GmbH & Co.,
Hannover, Fed. Rep. of Germany

[21] Appl. No.: 401,585

[22] Filed: Aug. 31, 1989

[30] Foreign Application Priority Data

Sep. 16, 1988 [DE] Fed. Rep. of Germany ....... 3831554

[51] Int. Cl.$^5$ ............................................. F16K 15/14
[52] U.S. Cl. .................................. 137/513.5; 137/854
[58] Field of Search ............... 137/513.3, 513.5, 513.7, 137/854, 512.15

[56] References Cited

U.S. PATENT DOCUMENTS

| 3,022,796 | 2/1962 | Cummings | 137/512.15 |
| 3,395,725 | 8/1968 | Roach | 137/513.3 X |
| 3,788,352 | 1/1974 | Ane | 137/513.5 X |
| 4,022,113 | 5/1977 | Blatt | 137/513.5 X |
| 4,171,007 | 10/1979 | Bouteille | 137/513.7 X |
| 4,619,287 | 3/1985 | Hama | 137/513.3 |

FOREIGN PATENT DOCUMENTS

| 110397 | 5/1964 | Czechoslovakia | 137/513.7 |
| 1500257 | 9/1970 | Fed. Rep. of Germany . | |
| 2330291 | 1/1974 | Fed. Rep. of Germany . | |
| 3545666 | 7/1987 | Fed. Rep. of Germany . | |
| 1483432 | 4/1967 | France . | |
| 1530226 | 5/1968 | France . | |
| 97968 | 6/1982 | Japan | 137/854 |

Primary Examiner—Robert G. Nilson
Attorney, Agent, or Firm—Buchanan Ingersoll, P.C.

[57] ABSTRACT

A one-way restrictor is provided which is configured like a lip valve and includes a bypass flow channel. The bypass flow channel is formed by an at least one opening which is located between an intake and an outlet and can be covered, at least partially, by the sealing element of the valve. By way of a control member the sealing element can be moved relative to the opening in such a way that the cross-section of the opening covered by the sealing element can be adjusted.

60 Claims, 2 Drawing Sheets

ONE-WAY RESTRICTOR

FIELD OF THE INVENTION

The present invention relates, in general, to fluid communication control equipment and, more particularly, this invention relates to a one-way restrictor in which the cross-section of an opening forming a bypass flow channel can be adjusted by relatively simple means.

BACKGROUND OF THE INVENTION

Prior to the present invention, one-way restrictors for use in controlling the flow of pressurized fluids have been known and used. For example, a one-way restrictor of this type is known from the catalog Control Technology, Reg. 10, Page 1 and Page 2 of the WABCO Westinghouse Company, issued in Dec. 1975, under the description "Europe-One-Way-Restrictor".

The particular one-way restrictor taught in this reference includes an annular sealing element. Such annular sealing element is secured to a sleeve-shaped support member disposed within a housing member. A circumferential sealing lip forming a portion of the annular sealing element rests in a position such that it provides a seal against the surface of the wall of a bore formed in the housing of the one-way restrictor. Such circumferential sealing lip works in conjunction with this wall surface to form a check valve. The check valve can be brought into the open position by a pressure medium. The annular sealing element is located in the fluid pressure flow passage formed in this one-way restrictor by the outer surface of the sleeve-shaped support member and the surface of the inside wall of such housing bore. The fluid pressure flow passage is formed in the shape of an annular clearance. Such fluid pressure flow passage connects a pressure-medium inlet chamber with a pressure-medium outlet chamber. The inlet chamber is equipped for connection to a source of pressure medium and such outlet chamber is equipped for connection with a consumer of such pressure medium. In addition, in this prior art one-way restrictor, the inlet chamber and the outlet chamber are interconnected by way of an internal bore formed in the sleeve-shaped support member.

This one-way restrictor has a control member that is capable of rotating about its longitudinal axis positioned within the valve box. This control member includes a portion which extends into the internal bore of such sleeve-shaped member. The portion of such control member extending into such internal bore of the sleeve-shaped support member is essentially conically shaped. The conical-shaped portion of such control member in conjunction with the surface of the inside wall of the sleeve-shaped support member, which is disposed opposite the shell surface of such conical-shaped portion, thus define a second annular clearance. By way of this second annular clearance, the pressure-medium outlet chamber remains constantly connected for fluid communication with the pressure-medium inlet chamber. A guide member for such control member is disposed in such valve box. The control member, on its side which faces away from the conical-shaped portion, is provided with a threaded portion. This threaded portion of the control member threadedly engages a counterthreaded portion formed in such guide member.

The opening cross-section of the one-way restrictor is formed by the conical-shaped portion of the control member and the inside wall of the sleeve-shaped support member. Such opening cross-section can be changed by simply rotating the control member about its longitudinal axis. Due to the threaded engagement between the threaded portion of the control member and the threaded portion of the guide member such rotation of the control member will cause it to move in the direction of its longitudinal axis.

As can be seen from the above description of this prior art one-way restrictor, it is comprised of a rather large number of component parts which require a considerable amount of assembly effort. In addition, as is well known, the greater number of component parts increases the chances of something failing which will require repair or replacement.

SUMMARY OF THE INVENTION

The present invention provides a one-way restrictor for use in controlling fluid communication of a pressure medium in a system requiring a pressurized medium. Such one-way restrictor includes a housing member having a fluid pressure inlet chamber and a fluid pressure outlet chamber formed therein. Disposed within the housing member between the inlet chamber and the outlet chamber is a check valve. This check valve can be brought into the open position in the direction of the flow of such pressure medium, i.e., from the inlet chamber to the outlet chamber. Such check valve includes a lip-type sealing element. Disposed within the housing member is a bypass flow channel. This bypass flow channel has a variable cross-section. In the one-way restrictor of the present invention, this bypass flow channel is formed by at least one opening. This opening is located between the inlet chamber and the outlet chamber. At least a portion of this opening is covered by the sealing element. The sealing element is movable, in a predetermined manner, with respect to the opening. Such movement of the sealing element is accomplished by means of a control member. Further, movement of such sealing element is brought about in a manner such that, when moved, the cross-section of the opening covered by the sealing element can be adjusted.

OBJECTS OF THE INVENTION

It is, therefore, one of the primary objects of the present invention to provide a one-way restrictor which requires fewer component parts to accomplish its intended function during use.

Another object of the present invention is to provide a one-way restrictor that is more easily assembled.

Still another object of the present invention is to provide a one-way restrictor which can be manufactured at a lower cost.

A further object of the present invention is to provide a one-way restrictor in which the manufacture of the component parts is greatly simplified.

An additional object of the present invention is to provide a one-way restrictor which will require less maintenance during its useful life.

In addition to the various objects and advantages of the one-way restrictor of the present invention which have been described above, various other objects and advantages of the present invention will become more readily apparent to those persons who are skilled in the fluid flow art from the following more detailed description of the invention, particularly when such descrip-

BRIEF DESCRIPTION OF THE INVENTION

Prior to proceeding to the more detailed description of the present invention, it should be noted that, in each of the drawing Figures, identical components which have identical functions have been identified with identical reference numerals throughout the several views for the sake of clarity.

Figures 1, 2:
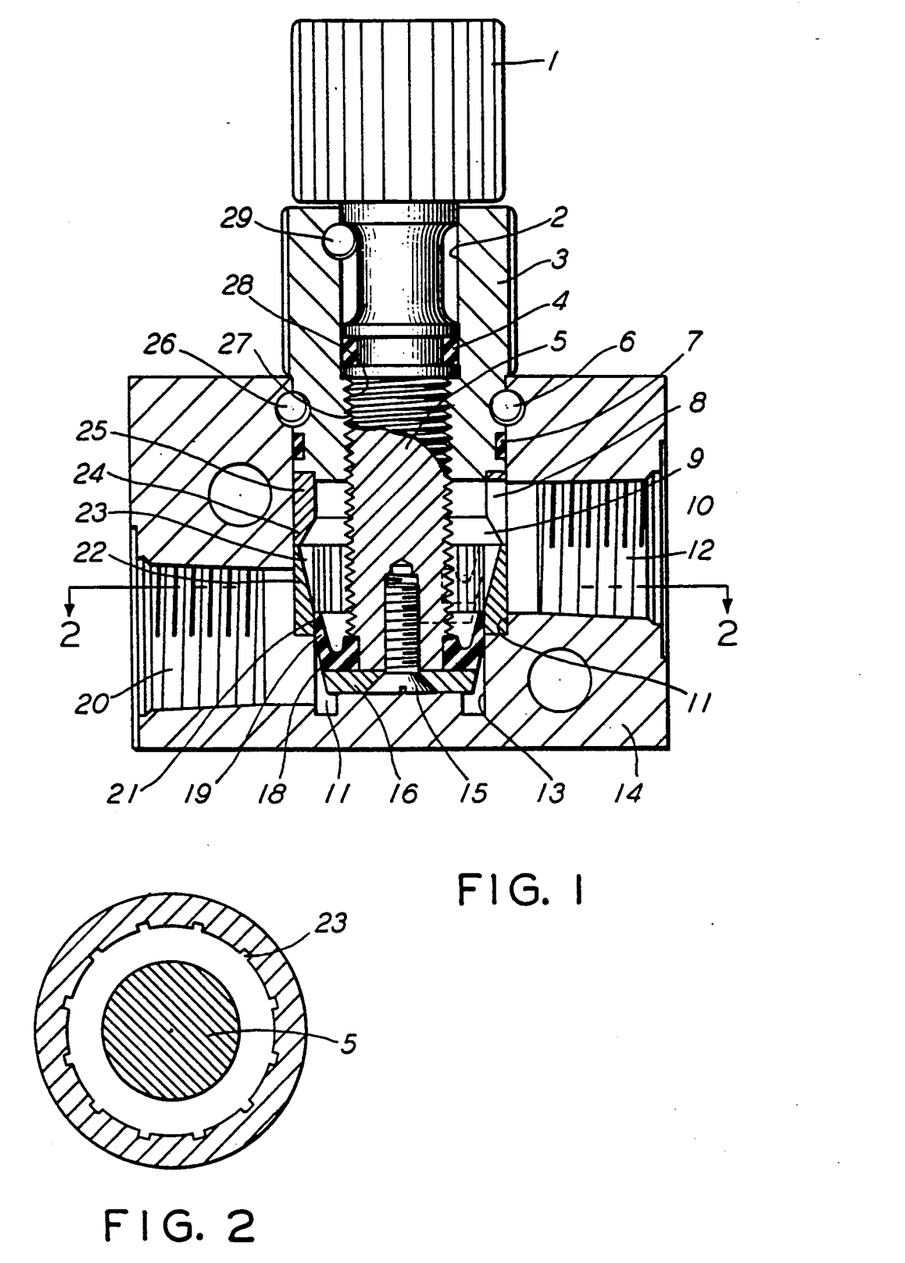
FIG. 1 is a said elevation view, partially in cross-section, which illustrates one presently preferred embodiment of a one-way restrictor that includes an annular groove seal as a valve body in which such annular groove seal in conjunction with at least one slot formed in the sealing surface of a housing bore which accepts the annular groove seal forms a restrictor with a variable port cross-section.
FIG. 2 is a partial fragmented cross-sectional view of the elements 5 and 22 taken along lines 2—2 of FIG. 1 which illustrates the sealing surface having a plurality of slots formed therein.

Reference is now made to FIG. 1 wherein one presently preferred embodiment of a one-way restrictor constructed according to this invention is illustrated. As shown in FIG. 1, such one-way restrictor includes a valve box, which will be hereinafter referred to as a housing member 14. The housing member 14 includes a graduated recess 11 and 13 formed therein, as well as an inlet chamber 20 and an outlet chamber 12. The inlet chamber 20, adjacent an outer surface of the housing member 14, is adapted to be connected to a source of fluid pressure medium and such outlet chamber 12, adjacent an outer surface of such housing member 14, is adapted to be connected to a consumer of such fluid pressure medium. Essentially, the pressure-medium inlet chamber 20 and the pressure-medium outlet chamber 12 are oriented in the housing member 14 transverse to the longitudinal axis of the graduated recess 11 and 13. Additionally, the pressure-medium inlet chamber 20 and the pressure-medium outlet chamber 12 are offset from one another and each is connected for fluid communication with such graduated recess 11 and 13. Located within the graduated recess 11 and 13 of the housing member 14 is a first cylindrical annular body 22. Such first annular body 22 is supported on the ledge portion formed by the graduated recess 11 and 13 located in the housing member 14. A predetermined number of slots 23 are formed into the surface of the wall which bounds the free interior space of the first annular body 22. Each of these slots 23 is oriented essentially in the direction of the longitudinal axis of such first annular body 22. Such slots 23 are both configured and arranged in a manner such that the depth of the slots 23, starting from the end portion of the first annular body 22 which is supported on the ledge portion of the graduated recess 11 and 13, increases in the direction of the front of such fixed annular body 22 which is facing away from this end portion. The slots 23 which are designed as a port have the function of a bypass flow channel.

In addition, a second annular body 25 is disposed in the graduated recess 11 and 12 of the housing member 14. Such second annular body 25 is positioned to rest on the first annular body 22. On the side of the second annular body 25 which faces the first annular body 22, a beveled portion 24 is provided. Such beveled portion 24 is oriented from the inner shell surface to the outer shell surface of such second annular body 25. This results in this second annular body 25 having a narrow ring area. The narrow ring area of such second annular body 25 has essentially the same cross-section as a matingly engageable ring area of the first annular body 22 when the ring area of such first annular body 22 is measured from the deepest point of the slots 23 to the outer shell surface of the first annular body 22. The deepest point of such slots 23 occurs at the base of the groove formed in such first annular body 22.

The graduated recess 11 and 13 in the housing member 14 is sealed by a cover member 3. Such cover member 3 partially extends into such graduated recess 11 and 13 to a point where it rests of the front sides of the second annular body 25 which is facing away from such first annular body 22.

This cover member 3 is secured on the housing member 14 by a retaining means 6 and 26. Because it is desirable to secure such cover member 3 to the housing member 14 in a removable manner, boltsare one presently preferred retaining means 6 and 26, although other retaining devices can be used without departing from the spirit and scope of the present invention. A sealing ring member 7 is provided within a circumferential groove formed in the cover member 3. The sealing ring member 7 contacts and forms a fluid-pressure-tight seal at the wall surface bounding a widest portion 11 of such graduated recess 11 and 13 formed within the body of the housing member 14.

A bore 2 is provided in the cover member 3. Such bore 2 is oriented in the direction of the longitudinal axis of the cover member 3. The longitudinal axis of such cover member 3 being in a coaxial position relative to each of the first annular body 22 and the second annular body 25. The bore 2 includes a threaded portion 28. This threaded portion 28 in the bore 2 is located in that area of the cover member 3 which is disposed inside of such housing member 14. The one-way restrictor of the present invention includes a control member 5. Such control member 5 has a threaded portion 27 on a portion of its axial length. Such threaded portion 28 in the bore 2 threadedly engages the threaded portion 27 of the control member 5. In this manner, the bore 2 in the cover member 3 serves as a guide member for the control member 5.

The overall length of the control member 5 is such that it extends completely through the entire cover member 3. In addition, the control member 5 extends completely through the free interior space of each of the first annular body 22 and the second annular body 25. The end of such control member 5 located within the housing member 14 terminates at a point located near the base which defines the graduated recess 11 and 13.

Located adjacent the end of such control member 5, which is facing the base of such graduated recess 11 and 13, is an annular sealing element 18 and 19. Such annular sealing element 18 and 19 encircles such end of the control member 5 and includes a circumferential elastic sealing lip 19. Such elastic sealing lip 19 extends outwardly from the body portion 18 of such annular sealing element 18 and 19. The annular sealing element 18 and 19 is slid into a recessed portion formed adjacent the end portion of the control member 5. Such annular sealing element 18 and 19 is illustrated as being retained on the end portion of such control member 5 by means of a plate-like stop member 16. Such plate-like stop member 16 is anchored to the end portion of such control member 5 by a bolt 15. It is understood that other means of securing such plate-like stop member 16 to the end portion of such control member 5 can be used and are within the spirit and scope of the present invention.

The circumferential sealing lip 19 of the annular sealing element 18 and 19 rests in a pretensioned manner and so as to form a fluid-pressure-tight seal on a sealing surface area 21 of the first annular body 22.

The sealing surface area 21 of the first annular body 22 is formed by the inner shell surface of the first annular body 22. This sealing surface area 21 encircles both the annular sealing element 18 and 19 and the control member 5. Such sealing surface area 21 of the first annular body 22 is divided into a closed first section and an adjacent second section; interrupted by the slots 23, in which the sealing lip 19 of the annular sealing element 18 and 19 merely contacts the members 10 which run parallel to the longitudinal axis of the control member 5 and bound the slots 23 forming the bypass flow channel.

The annular sealing element 18 and 19 in conjunction with the sealing surface area 21 forms a check valve 18, 19 and 21.

Such check valve 18, 19 and 21 divides the space defined by such first annular body 22 and the second annular body 25 positioned in the graduated recess 11 and 13 of the housing member 14 into a pressure-medium intake chamber 17 and a pressure-medium outlet chamber 9. The pressure-medium intake chamber 17 is connected to the inlet chamber 20 and the pressure-medium outlet chamber 9 is connected to outlet chamber 12 by way of an orifice 8. Such orifice 8 is formed through a wall portion of such second annular body 25.

The control member 5 includes an unthreaded portion. This unthreaded portion of the control member 5 is also guided in the bore 2 of such cover member 3. A sealing ring 4 is disposed in a circumferential groove formed in an outer surface of such threaded portion of the control member 5. The sealing ring 4 contacts and forms a fluid-pressure-tight seal at the surface of the wall bounding the bore 2 in the cover member 3. The unthreaded portion of such control member 5 also includes an area which has a reduced cross-section size. This area of reduced cross-sectional size is located between the side of the sealing ring 4 which faces away from the threaded portion 27 of such control member 5 and the end section of the control member 5 which extends out of the bore 2 in the cover member 3. A pin like retainer member 29 is provided to limit the movement of the control member 5 in the direction of its longitudinal axis. This pin-like retainer member 29 is located near the area of reduced cross sectional size and at the wall surface of the bore 2 in cover member 3.

On the end of the control member 5 that is extending outwardly from the cover member 3, there is a knob-type actuating element 1 provided. Such knob-type actuating element 1 facilitates turning of the control member 5 by an operator and thereby adjusting the longitudinal position of such control member 5 and the check valve 18, 19, and 21.

In the vicinity of the slots 23 formed in the first annular body 22, the annular sealing element 18 and 19 in conjunction with the members 10 which bound the slots 23 forms an adjustable restrictor. However, because of the reversing action of the check valve 18, 19 and 21, such adjustable restrictor will only become effective in the direction from the pressure-medium outlet chamber 9 to the pressure-medium inlet chamber 17. In this embodiment of the invention, the adjustable restrictor corresponds to the previously discussed bypass flow channel.

When assembled, according to the present invention, the maximum opening obtainable by the one-way restrictor 18, 19, 10, 23, and 21 in the direction of the flow of the pressure-medium, i.e., from the intake (pressure-medium inlet chamber 20) to the outlet (pressure-medium outlet chamber 12), is determined by the elongated aperture located between the unslotted area (sealing area 21) of the first annular body 22 and the outer shell surface of the body portion 18 of such annular sealing element 18 and 19.

In this embodiment the body portion 18 of the annular sealing element 18 and 19 consists of the same material as the circumferential sealing lip 19. In fact, such annular sealing element 18 and 19 will preferably be a one-piece molded element. However, it should be understood that the support body portion 18 for the circumferential sealing 19 may be both of a different material and be a separate component. For example, the support body portion 18 may be manufactured from either a plastic or metal material, if desirable.

Now refer more particularly to FIG. 2 which is a cross-sectional view which was taken along lines 2—2 of FIG. 2. In FIG. 2 a presently preferred orientation of the plurality of slots 23 with respect to the control member 5 is illustrate.

In a cut-away portion of the housing member 14, the recess portion 11 of the graduated recess 11 and 13 which receives the first annular body 22 therein can be seen. Such first annular body 22 surrounds the control member 5, having the annular sealing element 18 and 19 secured thereto at one end thereof, at a substantially uniform predetermined distance. This annular space is defined, on the one hand, by the outer shell surface area of the control member 5 and, on the other hand, by the inner shell surface area of the first annular body 22. This annular space constitutes the pressure-medium intake chamber 9 and 17. In addition, this annular space provides the means by which the intake chamber 9 and 17 can be connected with the outlet chamber 12. Further, such annular space is the area in which the check valve 18, 19 and 21 is located.

The inner shell surface area of the first annular body 22 includes at least one slot 23 having both a predetermined size and shape. Such at least one slot 23 is oriented at least somewhat in the longitudinal direction of such first annular body 22. Further, this at least one slot 23 is bounded by members 10. The members 10 are joined to the lower portion 21 of the first annular body 22. The lower portion 21 of the first annular body 22 does not have any slots 23 provided therein. However, this lower portion 21 includes a circumferential surface area portion of the inner shell surface area of the first annular body 22 which runs substantially parallel to the longitudinal axis of the first annular body 22. In this manner, when the control member 5, is adjusted by movement of such control member 5 in the direction of its longitudinal axis, the circumferential sealing lip 19 of the annular sealing element 18 and 19 will always form a substantially fluid-pressure-tight seal against a cylindrical sealing area. In this arrangement of the invention, the cylindrical sealing area may be interrupted above the lower portion 21 of the first annular body 22. That is, in the direction toward the pressure-medium outlet chamber 12 by the at least one increasingly deeper slot 23.

Although the plurality of slots 23 have been illustrated in FIGS. 1 and 2 as substantially rectangular in cross-section, it should be understood that such slots 23 may be of any number of different shapes if desired. For example, instead of such slots 23 becoming increasingly deeper toward the pressure-medium outlet chamber 12, they might be formed by depressions which become increasingly wider on the periphery of the inner shell surface area of the first annular body 22. In this case, such increasingly wider depressions forming the bypass flow channel may be bounded by correspondingly raised areas where necessary or desirable.

The operating function of the one-way restrictor illustrated in FIGS. 1 and 2 and described in detail above will now be explained in more detail.

In the position of the control member 5, as illustrated in FIG. 1, the circumferential sealing lip 19 of the annular sealing element 18 and 19 contacts the sealing surface area of the lower portion 21 of the first annular body 22. In this manner, a fluid-pressure-tight seal is formed. As noted above, this lower portion 21 of the first annular body 22 does not have any slots 23 provided therein.

When a fluid pressure-medium is communicated by way of the pressure-medium inlet chamber 20 into the pressure-medium intake chamber 17, the fluid pressure building up in such pressure-medium intake chamber 17 will cause the circumferential sealing lip 19 of the annular sealing element 18 and 19 to elastically deform. This elastic deformation of such circumferential sealing lip 19 will occur essentially in a radial direction toward the control member 5. When such elastic deformation occurs, the result is that the maximum annular opening cross-section of the one-way restrictor 18, 19 and 21 is cleared, i.e., the annular aperture between the sealing area of the lower portion 21 of the first annular body 22 and the outer shell surface area of the annular sealing element 18 and 19 is cleared.

As soon as the elastic deformation of the annular sealing element 18 and 19 occurs, the fluid pressure-medium is communicated from the pressure-medium intake chamber 17 into the pressure-medium outlet chamber 9 and from there such pressure-medium flows through the pressure-medium outlet chamber 12 to a consumer. Such consumers of the fluid pressure-medium may be, for example only, a hydraulic-fluid reservoir.

On the other hand, if the pressure-medium supply to the pressure-medium intake chamber 17 is interrupted, for any reason, a pressure drop will be created from such pressure-medium outlet chamber 9 to such pressure-medium intake chamber 17. When this pressure drop occurs, the circumferential sealing lip 19 of the annular sealing element 18 and 19 will once again sealingly engage the sealing surface area of the lower portion 21 of the first annular body 22 to form a fluid-pressure-tight seal. In this manner, the connection that existed between the pressure-medium outlet chamber 9 and the pressure-medium intake chamber 17 will be interrupted. Consequently, because the check valve 18, 19 and 21 is in a closed position, such pressure-medium present within the consumer cannot return via such check valve 18, 19 and 21.

However, after communicating the fluid pressure-medium into the consumer, if and when it becomes desirable for such fluid pressure in such consumer to be decreased in a throttled action, then the simple rotation of the knob member 1 of the control member 5 will cause a shifting movement of such control member 5 and thus the annular sealing element 18 and 19 along the longitudinal axis of such control member 5. During this movement of the control member 5, along its longitudinal axis, the circumferential sealing lip 19 of the annular sealing element 18 and 19 is released from the closed annular sealing surface area of the lower portion 21 of the first annular body 22 and makes contact with the sealing surface area of the first annular body 22 which is formed by the members 10 and interrupted by the at least one slot 23 (See the dashed sealing element in FIG. 1).

As discussed above, during the fluid pressure-medium feeding phase, such pressure-medium causes the circumferential sealing lip 19 of the annular sealing element 18 and 19 to be lifted off of the sealing surface area of the members 10 of the first annular body 22. When this occurs, the maximum opening of the one-way restrictor 18 19, 21, 23 and 10 is cleared. Absent an interruption, such fluid pressure-medium can be communicated from the pressure-medium intake chamber 17 to the pressure-medium outlet chamber 9 and ultimately on to the consumer of such fluid pressure-medium.

Also, as discussed above, should the fluid pressure-medium supply to the pressure-medium intake chamber 17 be interrupted, for any reason, the circumferential sealing lip 19 of such annular sealing element 18 and 19 will contact the sealing surface area of members 10. Through the at least one slot or slots 23, the fluid pressure-medium can then flow out of the pressure-medium chamber 9 and thus also flow out of the consumer by way of such slots 23, whose cross-section is reduced, with a throttled action to the pressure-medium intake chamber 17. From the intake chamber 17, such fluid pressure-medium flows to the pressure-medium inlet chamber 20.

Since, in this presently preferred embodiment of the invention, the slots 23 are configured with an increasing cross-section in the direction toward such pressure-medium outlet chamber 12 and thus a decreasing cross-section in the direction toward such pressure-medium inlet chamber 20, the one-way restrictor 18, 19, 21, 23 and 10 cross-section can be easily and readily changed. Such change of the cross-section of the restrictor 18, 19, 21, 23 and 10 occurs automatically with a change in the position of the annular sealing element 18 and 19.

Figure 3:
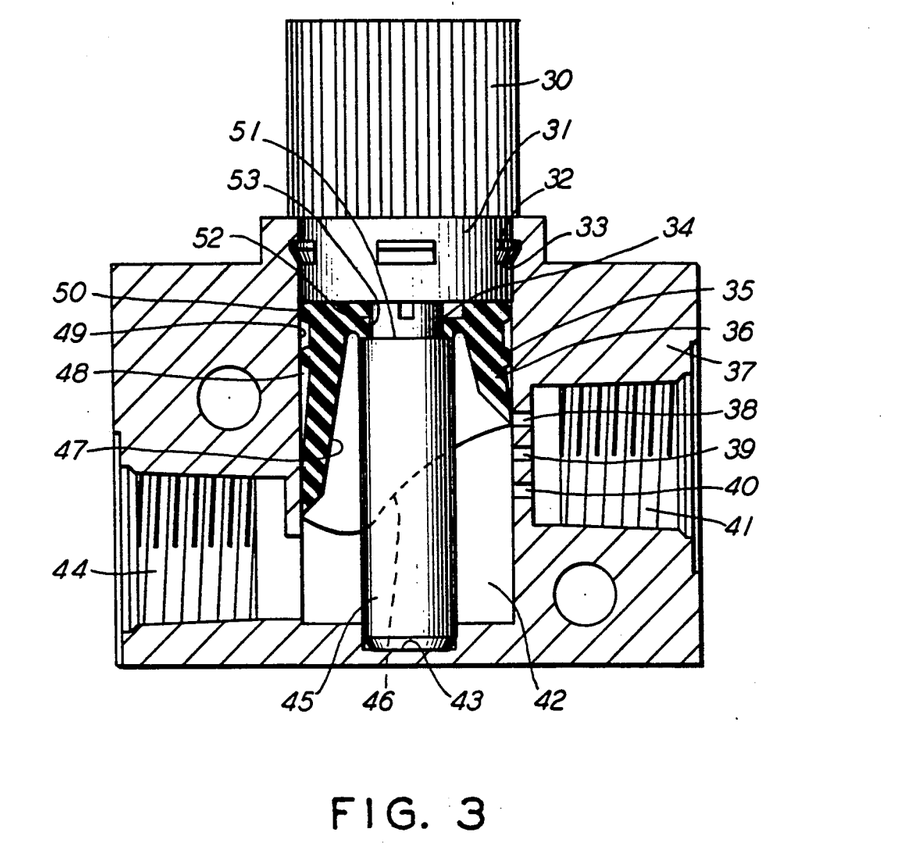
FIG. 3 is a side elevation view, partially in cross-section, which illustrates an alternative embodiment of a one-way restrictor, according to the present invention, in which a cup-shaped sealing element at least partially covers the pressure medium inlet chamber with its outer shell surface.

Attention is now directed to FIG. 3. illustrated in FIG. 3 is an alternative embodiment of a one-way restrictor assembled according to the present invention. This one-way restrictor is equipped with a cup-shaped sealing element. As is evident from FIG. 3, this one-way restrictor requires the fewest number of component parts.

The one-way restrictor includes a housing member 37 having a box recess 49 and 42 formed therein. The box recess 49 and 42 is connected for fluid communication to a pressure-medium intake port 41 and to a pressure-medium outlet port 44. Such pressure-medium intake port 41 receives a fluid pressure-medium from a fluid pressure supply source and such pressure-medium outlet port 44 enables communication of such fluid pressure-medium to a consumer. As with the embodiment illustrated in FIGS. 1 and 2, such consumer may be, for example, a hydraulic fluid reservoir. The intake port 41 and the outlet port 44 are offset against each other. Such offset of the intake port 41 and the outlet port 44 occurs toward the longitudinal axis of the box recess 49 and 42 formed in the housing member 37. A plurality of ports 38, 39 and 40 is provided in the intake port 41 area. Such ports 38, 39 and 40 are formed in the wall which bounds the box recess 49 and 42. The intake port 41 is connected for fluid communication to such box recess 49 and 42 by way of such ports 38, 39 and 40. In this embodiment of the invention, the box recess 49 and 42 serves as a pressure-medium chamber. Although three ports 38, 39 and 40 have been illustrated in FIG. 3, it is to be understood that fewer ports or more ports are within the spirit and scope of the present invention.

The box recess 49 and 42 formed in the housing member 37 is sealed in a pressure-tight manner with a cover member 31. Such cover member 31 is inserted into the open front side of the box recess 49 and 42. The cover member 31 is secured in the recess portion 49 of the box recess 49 and 42 by means of projections 32. The projections 32 are positioned on the outer shell surface area of the cover member 31. Such projections extend essentially radially outward from this outer shell surface area and engage in a groove 33 provided in a wall area bounding the box recess 49 and 42. It is to be understood that such cover member 31 can be secured to the housing member 37 by other suitable securing means (not shown).

An orifice (not shown) is formed through the cover member 31. Such orifice is located substantially at the center of such cover member 31. One end piece 34 of a control member 45 and 34 is passed out of the housing member 37 through this orifice in the cover member 31. The portion 45 of the control member 45 and 34 is arranged coaxially in such box recess 49 and 42. The end of the portion 45 of the control member 45 and 34 is disposed in a recess portion 43 located adjacent the bottom portion of the housing member 37. A control knob 30, used by an operator to adjust the relative position of the control member 45 and 34, is secured to the end piece 34 extending out of the housing member 37. As will become clear hereinafter, the adjustment of the control member 45 and 34 can be accomplished without the use of a threaded engagement between the cover member 31 and the end piece 34 of such control member 45 and 34.

This embodiment of the one-way restrictor includes a cup-shaped sealing element 36. Such cup-shaped sealing element 36 is manufactured from an elastic-type material. This cup-shaped sealing element 36 is slid onto the end piece 34 of the control member 45 and 34. The end piece 34 of the control member 45 and 34 includes a smaller cross-section which extends into the cavity of the recess portion 49 of such box recess 49 and 42.

The cup-shaped sealing element 36 includes a cavity or clearance 47. Such clearance 47 is similar to a cutout. This clearance 47 begins adjacent the bottom 52 of the cup-shaped sealing element 36 and extends to the free end area thereof. The clearance 47 is provided to make it easier to achieve the necessary amount of elastic deformation of such cup-shaped sealing element 36 during fluid pressure communication through the one-way restrictor. A substantial reduction in the frictional forces that can exist between the wall bounding the recess portion 49 of the box recess 49 and 42 and the outer shell surface area of the cup-shaped sealing element 36 during a turning or rotational movement of the cup-shaped sealing element 36 is achieved. This reduction in frictional forces is achieved because of the pair of circumferential bulge-like projections 50 and 35 provided on the outer shell surface of such cup-shaped sealing element 36 adjacent the bottom 52 thereof and because only a relatively small portion of outer shell surface area of such cup-shaped sealing element 36 comes into contact with such wall bounding such recess portion 49 of the box recess 49 and 42.

The peripheral edge portion 46 of the cup-shaped sealing element 36 does not run parallel to the bottom 52 of the cup-shaped sealing element 36. Instead, such peripheral edge portion 36, starting from the point of the free end of such cup-shaped sealing element 36 farthest away from the bottom 52, runs at an angle toward the bottom 52 of such cup-shaped sealing element 36. As seen in FIG. 3, the peripheral edge portion 46 is that edge portion of such cup-shaped sealing element 36 which faces away from the bottom 52. The slanted portion of the peripheral edge portion 46 is configured in a manner such that the maximum length is such that the entire open cross-section of the intake port 41 can be sealed by this portion of the outer shell surface area of the cup-shaped sealing element 36. This maximum length is the length as measured in the axial direction of the cup-shaped sealing element 36. The intake port 41 is configured in a manner such that the opening cross-section thereof can be adjusted.

That portion of the outer shell surface area of the cup-shaped sealing element 36, i.e., that portion adjacent the smaller axial extension, is dimensioned and configured in a manner such that substantially the entire open cross-section of the intake ports 38, 39 and 40 at the inlet chamber 41 will be cleared when the cup-shaped sealing element 36 is located in the position illustrated in FIG. 3.

Primarily due to the fact that the free end portion of the cup-shaped sealing element 36 is virtually in the shape of a tube cut on a slant (ellipse) the open cross-section of such intake ports 38, 39 and 40 of the intake chamber 41 is infinitely variable. Such infinite variability is achieved in this embodiment of the invention by simply rotating the cup-shaped sealing element 36 by means of the knob 30 attached to one end of the control member 45 and 34. The maximum length of the cup-shaped sealing element 36 will preferably be such that the cross-section of the port which is in fluid communication with the outlet chamber 44 will not be reduced. This will be the desired case regardless in which position the cup-shaped sealing element 36 may be.

The peripheral wall portion 46, of the cup-shaped sealing element 36, and the surface of the wall acting as a sealing surface in the area of the intake chamber 41 and bounding the recess portion 49 of the box recess 49 and 42 form a one-way restrictor 49, 36 and 46. Such one-way restrictor 49, 36 and 46 has a variable restrictor cross-section.

It is to be understood that, although presently preferred, it is not necessary for the sealing element employed in the one-way restrictor to be cup-shaped, as illustrated in FIG. 3 and described above. For example, such sealing element may also be comprised of a plate-like component. It is necessary, however, that the plate-like component to be used as the sealing element be made from an elastic material. In addition, such plate-like component must be adapted to the particular shape of the wall bounding the recess portion 49 of the box recess 49 and 42. Furthermore, the free end portion of such plate-like component must be slanted in the manner described above with respect to the cup-shaped sealing element 36.

The operational function of the one-way restrictor 49, 36 and 46 according to this embodiment of the invention as described above will now be explained in more detail.

The position of the cup-shaped sealing element 36, as illustrated in FIG. 3, is such that the entire opening cross-section of the intake ports 38, 39, and 40 connected for fluid pressure communication with the intake chamber 41 is cleared. It should be noted that the shape of such opening cross-section is not critical. For example, such shape can be round, rectangular, oblong, etc. From the intake chamber 41, the pressure-medium is communicated directly through the pressure-medium chamber formed by the box recess 49 and 42 in the housing member 37 to the outlet chamber 44. From the outlet chamber 44, such pressure-medium is communicated on to the consumer. Such consumer may be, for example, a hydraulic-fluid reservoir.

In a first case, where an unrestricted return flow of the pressure-medium can be tolerated, if the pressure-medium being communicated to the intake chamber 41 is interrupted, for any reason, then the pressure-medium will flow back from the consumer through the outlet chamber 44 connected thereto and the pressure-medium chamber formed by the box recess 49 and 42 formed in the housing member 37 to the intake chamber 41 and unrestrictedly be communicated through such intake chamber 41 into the connected pressure-medium communication line.

On the other hand, in a second case, if a restricted return flow of the pressure-medium is desired, or necessary, the cup-shaped sealing element 36 is rotated about its longitudinal axis by rotating the knob 30 connected to one end of the control member 45 and 34 to a predetermined position. During this process, the portion of the cup-shaped sealing element 36 having the longest axial extension will come into contact with the sealing surface area adjacent the intake chamber 41 and, depending on the position of such cup-shaped sealing element 36, cover more or less of the flow cross-section of the fluid communication ports 38 and 39, for example only, as required to restrict the flow of such pressure-medium.

Now consider a third case where at least one or more of such fluid communication ports 38, 39 and 40 are covered by such cup-shaped sealing element 36 and the pressure-medium is being communicated to the intake chamber 41. In this case, let us assume fluid communication ports 38 and 39 are closed by such cup-shaped sealing element 36. Now, when such fluid pressure-medium is communicated into the intake chamber 41, such pressure-medium reaches chamber portion 48 of the fluid pressure-medium chamber 48 and 42 by way of such closed fluid communication ports 38 and 39. Simultaneously, by way of the uncovered fluid communication port, in this case fluid communication port 40, connected for fluid communication with the intake chamber 41 the pressure-medium is communicated directly into the chamber portion 42 of such fluid pressure-medium chamber 48 and 42. The pressure that is building up within the fluid pressure-medium chamber 48 and 42 will cause an elastic deformation of the cup-shaped sealing element 36. Such elastic deformation will occur essentially radially inward toward the longitudinal axis of the control member 45 and 34. At this point, the free end portion of the cup-shaped sealing element 36 comes free of the wall portion serving as the sealing surface area and which bounds the recess portion 49 of the box recess 49 and 42. Thereafter, the fluid pressure-medium will be communicated in an unrestricted manner from the pressure-medium chamber 48 and 42 through the completely open one-way restrictor 49, 36 and 46 to the outlet chamber 44 and on to the consumer (not shown).

In this third case, if the fluid pressure-medium being communicated to the intake chamber 41 is interrupted, for any reason, the pressure-medium in such consumer as well as the pressure-medium in the portion 42 of the pressure-medium chamber 48 and 42 will try to flow back to the portion 48 of the pressure-medium chamber 48 and 42 and thus, likewise, toward the intake chamber 41.

Because of the pressure drop which occurs from the outlet chamber 44 toward the intake chamber 41, following the interruption of such pressure-medium being supplied to the intake chamber 41, the cup-shaped sealing element 36, due to the elasticity of such cup-shaped sealing element 36, will resume its original shape. Once the cup-shaped sealing element 36 resumes its original shape, the outer shell surface area will once more make sealing contact with the sealing surface area of the recess portion 49 of the box recess 49 and 42 formed in the housing member 37.

Therefore, such pressure-medium in the pressure-medium chamber 48 and 42 and thus also in the consumer can now only escape with a restricted flow through a partial section of the open cross-section of the fluid communication port 40 connected for fluid communication with the intake chamber 41 and into the connecting fluid communication line.

It can be seen from the above description of the invention that an improved one-way restrictor is provided which requires fewer complex component parts and can be more easily assembled thereby providing a lower manufacturing cost.

Although a number of presently preferred embodiments of a one-way restrictor have been described in considerable detail above, it should be obvious to those persons who are skilled in the fluid communication control art that various other modifications and adaptations of such one-way restrictor can be made without departing from either the spirit of the present invention or the scope of the appended claims.

We claim:

1. A one-way restrictor for use in a fluid pressure communication system to control flow of a fluid pressure-medium, said one-way restrictor comprising:
   (a) a housing member;
   (b) an intake chamber formed in said housing member and connectable to a source of such fluid pressure-medium;
   (c) an outlet chamber formed in said housing member and connectable to a consumer of such fluid-pressure medium;
   (d) a check valve disposed in said housing member intermediate said intake chamber and said outlet chamber, said check valve capable of being brought into an open position in a direction of fluid communication of such fluid pressure-medium from said intake chamber to said outlet chamber;
(e) a bypass flow channel disposed in said housing member, said bypass flow channel having a variable cross-section, at least a portion of said bypass flow channel being formed by an at least one opening located intermediate said intake chamber and said outlet chamber;
(f) a control member positioned for movement in a predetermined manner within a cavity formed in said housing member intermediate said intake chamber and said outlet chamber; and
(g) said check valve having a sealing element disposed within said housing member and engageable with said control member, said sealing element being capable of covering at least a portion of said bypass flow channel, said sealing element being movable relative to said bypass flow channel by said control member, movement of said sealing element is carried out in a manner such that when said sealing element is moved a cross-section of said bypass flow channel covered by said sealing element can be adjusted, said sealing element having at least a portion formed of a resiliently deformable material and being deformable from a sealing position to said open position by a fluid pressure differential across said at least a portion.

2. A one-way restrictor for use in a fluid pressure communication system to control flow of a fluid pressure-medium, said one-way restrictor comprising:
(a) a housing member;
(b) an intake chamber formed in said housing member and connectable to a source of such fluid pressure-medium;
(c) an outlet chamber formed in said housing member and connectable to a consumer of such fluid-pressure medium;
(d) a check valve disposed in said housing member intermediate said intake chamber and said outlet chamber, said check valve capable of being brought into an open position in a direction of fluid communication of such fluid pressure-medium from said intake chamber to said outlet chamber;
(e) a bypass flow channel disposed in said housing member, said bypass flow channel having a variable cross-section, at least a portion of said bypass flow channel being formed by an at least one opening located intermediate said intake chamber and aid outlet chamber;
(f) a control member positioned for movement in a predetermined manner within a cavity formed in said housing member intermediate said intake chamber and said outlet chamber;
(g) said check valve having a sealing element disposed within said housing member and engageable with said control member, said sealing element being capable of covering at least a portion of said bypass flow channel, said sealing element being movable relative to said bypass flow channel by said control member, movement of said sealing element is carried out in a manner such that when said sealing element is moved a cross-section of said bypass flow channel covered by said sealing element can be adjusted, said sealing element having at least a portion formed of a resiliently deformable material and being deformable from a sealing position to said open position by a fluid pressure differential across said at least a portion; and (h) wherein said check valve is formed by said sealing element mounted on said control member and a sealing area located on a wall surface of said housing member bounding said cavity having at least a portion of said control member and said sealing element disposed therein, said sealing element being mounted on said control member so that at least a portion thereof essentially extends, oriented transverse to a longitudinal axis of said control member, away from said control member.

3. A one-way restrictor, according to claim 2, wherein said sealing area is located adjacent an area of said intake chamber.

4. A one-way restrictor, according to claim 3, wherein said at least one opening is an at least one depression, said at least one depression being formed in a surface of a wall in said sealing area and said at least one depression in combination with said sealing element cooperating to form said bypass flow channel.

5. A one-way restrictor, according to claim 4, wherein said at least one depression is both configured and arranged in said surface of said wall in said sealing area so that a cross-section of said at least one depression decreases in a direction of said intake chamber.

6. A one-way restrictor, according to claim 5, wherein said at least one depression and said sealing element mounted on said control member form an adjustable restrictor in which said cross-section of said at least one depression can be changed in a direction of a return flow of such fluid pressure-medium by changing a relative position of said sealing element in an axial direction within said cavity in said housing member.

7. A one-way restrictor, according to claim 2, wherein said sealing area and said at least one opening forming said bypass flow channel are both dimensioned and arranged such that said intake chamber can be sealed off in a return flow direction of such fluid pressure-medium by said sealing element.

8. A one-way restrictor, according to claim 4, wherein said sealing area and said at least one depression are both dimensioned and arranged such that said intake chamber can be sealed off in said direction of said return flow of such pressure-medium.

9. A one-way restrictor, according to claim 6, wherein said sealing area and said at least one depression are both dimensioned and arranged such that said intake chamber can be sealed off in said direction of said return flow of such pressure-medium.

10. A one-way restrictor, according to claim 1, wherein said bypass flow channel includes a plurality of openings, said plurality of openings being located intermediate said intake chamber and said outlet chamber.

11. A one-way restrictor, according to claim 4, wherein said bypass flow channel includes a plurality of depressions, said plurality of openings being formed in said surface of said wall in said sealing area.

12. A one-way restrictor, according to claim 6, wherein said bypass flow channel includes a plurality of depressions, said plurality of openings being formed in said surface of said wall in said sealing area.

13. A one-way restrictor, according to claim 7, wherein said bypass flow channel includes a plurality of openings, said plurality of openings being located intermediate said intake chamber and said outlet chamber.

14. A one-way restrictor, according to claim 9, wherein said bypass flow channel includes a plurality of depressions, said plurality of depressions being formed in said surface of said wall in said sealing area.

15. A one-way restrictor for use in a fluid pressure communication system to control flow of a fluid pressure-medium, said one-way restrictor comprising:
  (a) a housing member;
  (b) an intake chamber formed in said housing member and connectable to a source of such fluid pressure-medium;
  (c) an outlet chamber formed in said housing member and connectable to a consumer of such fluid-pressure medium;
  (d) a check valve disposed in said housing member intermediate said intake chamber and said outlet chamber, said check valve capable of being brought into an open position in a direction of fluid communication of such fluid pressure-medium from said intake chamber to said outlet chamber;
  (e) a bypass flow channel disposed in said housing member, aid bypass flow channel having a variable cross-section, at least a portion of said bypass flow channel being formed by an at least one opening located intermediate said intake chamber and said outlet chamber;
  (f) a control member positioned for movement in a predetermined manner within a cavity formed in said housing member intermediate said intake chamber and said outlet chamber;
  (g) said check valve having a sealing element disposed within said housing member and engageable with said control member, said sealing element being capable of covering at least a portion of said bypass flow channel, said sealing element being movable relative to said bypass flow channel by said control member, movement of said sealing element is carried out in a manner such that when said sealing element is moved a cross-section of said bypass flow channel covered by said sealing element can be adjusted, said sealing element having at least a portion formed of a resiliently deformable material and being deformable from a sealing position to said open position by a fluid pressure differential across said at least a portion;
  (h) wherein said sealing element includes an annular support member secured to said control member; and
  a continuous annular sealing lip engageable with said annular support member, said annular sealing lip being capable of covering said at least a portion of said opening forming said at least a portion of said bypass flow channel.

16. A one-way restrictor, according to claim 2, wherein said sealing element includes:
  (a) an annular support member secured to said control member; and
  (b) a continuous annular sealing lip engageable with said annular support member, said annular sealing lip sealingly engages said sealing area.

17. A one-way restrictor, according to claim 6, wherein said sealing element includes:
  (a) an annular support member secured to said control member; and
  (b) a continuous annular sealing lip engageable with said annular support member, said annular sealing lip sealingly engages said sealing area.

18. A one-way restrictor, according to claim 7, wherein said sealing element includes:
  (a) an annular support member secured to said control member: and
  a continuous annular sealing lip engageable with said annular support member, said annular sealing lip sealingly engages said sealing area.

19. A one-way restrictor, according to claim 11, wherein said sealing element includes:
  (a) an annular support member secured to said control member; and
  (b) a continuous annular sealing lip engageable with said annular support member, said annular sealing lip sealingly engages said sealing area.

20. A one-way restrictor, according to claim 15, wherein said annular sealing element is formed as a single-piece molding.

21. A one-way restrictor, according to claim 1, wherein said cavity formed in said housing member intermediate said intake chamber and said outlet chamber is a recess.

22. A one-way restrictor, according to claim 21, wherein said recess is a graduated recess.

23. A one-way restrictor, according to claim 22, wherein said one-way restrictor further includes a first annular body member positioned in said graduated recess of said housing member in a position to surround said sealing element and at least a portion of said control member, said first annular body member including a sealing surface formed by an inner shell surface thereof which faces said sealing element, said at least one opening forming said at least a portion of said bypass flow channel being located on said inner shell surface of said first annular body member which faces said sealing element and said control member.

24. A one-way restrictor, according to claim 6, wherein said cavity formed in said housing member intermediate said intake chamber and said outlet chamber is a graduated recess and said one-way restrictor further includes a first annular body member positioned in said graduated recess of said housing member in a position to surround said annular sealing element and at least a portion of said control member, said first annular body member including said sealing area which is formed by an inner shell surface thereof which faces said annular sealing element, said at least one depression forming said at least a portion of said bypass flow channel being located on said inner shell surface of said first annular body member which faces said annular sealing element and said control member.

25. A one-way restrictor, according to claim 8, wherein said cavity formed in said housing member intermediate said intake chamber and said outlet chamber is a graduated recess and said one-way restrictor further includes a first annular body member positioned in said graduated recess of said housing member in a position to surround said annular sealing element and at least a portion of said control member, said first annular body member including said sealing area which is formed by an inner shell surface thereof which faces said annular sealing element, said at least one depression forming said at least a portion of said bypass flow channel being located on said inner shell surface of said first annular body member which faces said annular sealing element and said control member.

26. A one-way restrictor, according to claim 11, wherein said cavity formed in said housing member intermediate said intake chamber and said outlet chamber is a graduated recess and said one-way restrictor further includes a first annular body member positioned in said graduated recess of said housing member in a position to surround said annular sealing element and at least a portion of said control member, said first annular body member including a sealing area which is formed by an inner shell surface thereof which faces said annular sealing element, said plurality of depressions forming said at least a portion of said bypass flow channel being located on said inner shell surface of said first annular body member which faces said annular sealing element and said control member.

27. A one-way restrictor, according to claim 19, wherein said cavity formed in said housing member intermediate said intake chamber and said outlet chamber is a graduated recess and said one-way restrictor further includes a first annular body member positioned in said graduated recess of said housing member in a position to surround said annular sealing element and at least a portion of said control member, said first annular body member including a sealing area which is formed by an inner shell surface thereof which faces said annular sealing element, said plurality of depressions forming said at least a portion of said bypass flow channel being located on said inner shell surface of said first annular body member which faces said annular sealing element and said control member.

28. A one-way restrictor, according to claim 6, wherein said at least one depression forming said at least a portion of said bypass flow channel is formed as a slot, said slot being shallower at one end thereof which extends toward said intake chamber than on an opposite end thereof which extends toward said outlet chamber.

29. A one-way restrictor, according to claim 8, wherein said at least one depression forming said at least a portion of said bypass flow channel is formed as a slot, said slot being shallower at one end thereof which extends toward said intake chamber than on an opposite end thereof which extends toward said outlet chamber.

30. A one-way restrictor, according to claim 11, wherein said plurality of depressions forming said at least a portion of said bypass flow channel are formed as slots, said slots being shallower at one end thereof which extends toward said intake chamber than on an opposite end thereof which extends toward said outlet chamber.

31. A one-way restrictor, according to claim 15, wherein said at least a portion of said bypass flow channel is formed as a slot, said slot being shallower at one end thereof which extends toward said intake chamber than on an opposite end thereof which extends toward said outlet chamber.

32. A one-way restrictor, according to claim 19, wherein said plurality of depressions forming said at least a portion of said bypass flow channel are formed as slots, said slots being shallower at one end thereof which extends toward said intake chamber than on an opposite end thereof which extends toward said outlet chamber.

33. A one-way restrictor for use in a fluid pressure communication system to control flow of a fluid pressure-medium, said one-way restrictor comprising:
 (a) a housing member;
 (b) an intake chamber formed in said housing member and connectable to a source of such fluid pressure-medium;
 (c) an outlet chamber formed in said housing member and connectable to a consumer of such fluid-pressure medium;
 (d) a check valve disposed in said housing member intermediate said intake chamber and said outlet chamber, said check valve capable of being brought into an open position in a direction of fluid communication of such fluid pressure-medium from said intake chamber to said outlet chamber;
 (e) a bypass flow channel disposed in said housing member, said bypass flow channel having a variable cross-section, at least a portion of said bypass flow channel being formed by an at least one opening located intermediate said intake chamber and said outlet chamber;
 (f) a control member positioned for movement in a predetermined manner within a cavity formed in said housing member intermediate said intake chamber and said outlet chamber;
 (g) said check valve having a sealing element disposed within said housing member and engageable with said control member, said sealing element being capable of covering at least a portion of said bypass flow channel, said sealing element being movable relative to said bypass flow channel by said control member, movement of said sealing element is carried out in a manner such that when said sealing element is moved a cross-section of said bypass flow channel covered by said sealing element can be adjusted, said sealing element having at least a portion formed of a resiliently deformable material and being deformable from a sealing position to said open position by a fluid pressure differential across said at least a portion;
 (h) wherein said cavity formed in said housing member intermediate said intake chamber and said outlet chamber is a box recess;
 (i) wherein said box recess is a graduated recess;
 (j) wherein said one-way restrictor further includes a first body member positioned in said graduated recess of said housing member in a position to surround said sealing element and at least a portion of said control member, said first annular body member including a sealing surface formed by an inner shell surface thereof which faces said sealing element, said at least one opening forming said at least a portion of said bypass flow channel being located on said inner shell surface of said first annular body member which faces said sealing element and said control member; and
 (k) wherein said at least one chamber forming said at least a portion of said bypass flow channel is formed as a slot located in said inner shell surface of said first annular body member which faces said annular sealing element and said control member, said at least one slot in said inner shell surface of said first annular body member is shallower at one end thereof which extends toward said intake opening than on an opposite end thereof which extends toward said outlet opening.

34. A one-way restrictor, according to claim 26, wherein said plurality of depressions forming said at least a portion of said bypass flow channel are formed as slots located in said inner shell surface of said first annular body member which faces said annular sealing element and said control member, said plurality of slots in said inner shell surface of said first annular body member is shallower at one end thereof which extends toward said intake chamber than an opposite end thereof which extends toward said outlet chamber.

35. A one-way restrictor for use in a fluid pressure communication system to control flow of a fluid pressure-medium, said one-way restrictor comprising:
 (a) a housing member;

(b) an intake chamber formed in said housing member and connectable to a source of such fluid pressure-medium;

(c) an outlet chamber formed in said housing member and connectable to a consumer of such fluid-pressure medium;

(d) a check valve disposed in said housing member intermediate said intake chamber and said outlet chamber, said check valve capable of being brought into an open position in a direction of fluid communication of such fluid pressure-medium from said intake chamber to said outlet chamber;

(e) a bypass flow channel disposed in said housing member, said bypass flow channel having a variable cross-section, at least a portion of said bypass flow channel being formed by an at least one opening located intermediate said intake chamber and said outlet chamber;

(f) a control member positioned for movement in a predetermined manner within a cavity formed in said housing member intermediate said intake chamber and said outlet chamber;

(g) said check valve having a sealing element disposed within said housing member and engageable with said control member, said sealing element being capable of covering at least a portion of said bypass flow channel, said sealing element being movable relative to said bypass flow channel by said control member, movement of said sealing element is carried out in a manner such that when said sealing element is moved a cross-section of said bypass flow channel covered by said sealing element can be adjusted;

(h) wherein said cavity formed in said housing member intermediate said intake chamber and said outlet chamber is a graduated recess and said one-way restrictor further includes;

(i) a first annular body member positioned in said graduated recess, said first annular body member having a sealing area provided at an inner shell surface thereof, an end portion of said inner shell surface of said first annular body member which extends in a direction of said intake chamber being configured as a circumferential area; and (j) a plurality of members located on a part of said inner shell surface which adjoins said sealing area and extends toward said outlet chamber said plurality of members bounding said at least one opening forming said at least a portion of said bypass flow channel which runs in a direction of a longitudinal axis of said first annular body member and whose frontal area facing said annular sealing element forms a sealing area interrupted by said at least one opening.

36. A one-way restrictor, according to claim 6, wherein said cavity formed in said housing member intermediate said intake chamber and said outlet chamber is a graduated recess and said one-way restrictor further includes:

(a) a first annular body member positioned in said graduated recess, said first annular body member having said sealing area provided at an inner shell surface thereof, an end portion of said inner shell surface of said first annular body member which extends in a direction of said intake chamber being configured as a circumferential area; and (b) a plurality of members located on a part of said inner shell surface which adjoins said sealing area and extends toward said outlet chamber, said plurality of members bounding said at least one depression forming said at least a portion of said bypass flow channel which runs in a direction of a longitudinal axis of said first annular body member and whose frontal area facing said annular sealing element forms a sealing area interrupted by said at least one depression.

37. A one-way restrictor, according to claim 9, wherein said cavity formed in said housing member intermediate said intake chamber and said outlet chamber is a graduated recess and said one-way restrictor further (a) a first annular body member positioned in said graduated recess, said first annular body member having said sealing area provided at an inner shell surface thereof, an end portion of said inner shell surface of said first annular body member which extends in a direction of said intake chamber being configured as a circumferential area; and (b) a plurality of members located on a part of said inner shell surface which adjoins said sealing area and extends toward said outlet chamber, said plurality of members bounding said at least one depression forming said at least a portion of said bypass flow channel which runs in a direction of a longitudinal axis of said first annular body member and whose frontal area facing said annular sealing element forms a sealing area interrupted by said at least one depression.

38. A one-way restrictor, according to claim 14, wherein said cavity formed in said housing member intermediate said intake chamber and said outlet chamber is a graduated recess and said one-way restrictor further (a) a first annular body member positioned in said graduated recess, said first annular body member having said sealing area provided at an inner. shell surface thereof, an end portion of said inner shell surface of said first annular body member which extends in a direction of said intake chamber being configured as a circumferential area; and (b) a plurality of members located on a part of said inner shell surface which adjoins said sealing area and extends toward said outlet chamber, said plurality of members bounding said plurality of said depression forming said at least a portion of said bypass flow channel which runs in a direction of a longitudinal axis of said first annular body member and whose frontal area facing said annular sealing element forms a sealing area interrupted by said plurality of said depressions.

39. A one-way restrictor, according to claim 19, wherein said cavity formed in said housing member intermediate said intake opening and said outlet chamber is a graduated recess and said one-way restrictor further includes:

(a) a first annular body member positioned in said graduated recess, said first annular body member having said sealing area provided at an inner shell surface thereof, an end portion of said inner shell surface of said first annular body member which extends in a direction of said intake chamber being configured as a circumferential area; and (b) a plurality of members located on a part of said inner shell surface which adjoins said sealing area and extends toward said outlet chamber, said plurality of members bounding said plurality of said depression forming said at least a portion of said bypass flow channel which runs in a direction of a longitudinal axis of said first annular body member and whose frontal area facing said annular sealing element forms a sealing area interrupted by said plurality of said depressions.

40. A one-way restrictor for use in a fluid pressure communication system to control flow of a fluid pressure-medium, said one-way restrictor comprising:
(a) a housing member;
(b) an intake chamber formed in said housing member and connectable to a source of such fluid pressure-medium;
(c) an outlet chamber formed in said housing chamber and connectable to a consumer of such fluid-pressure medium;
(d) a check valve disposed in said housing member intermediate said intake chamber and aid outlet chamber, aid check valve capable of being brought into an open position in a direction of fluid communication of such fluid pressure-medium from said intake chamber to said outlet chamber;
(e) a bypass flow channel disposed in said housing member, said bypass flow channel having a variable cross-section, at least a portion of said bypass flow channel being formed by an at least one opening located intermediate said intake chamber and said outlet chamber;
(f) a control member positioned for movement in a predetermined manner within a cavity formed in said housing member intermediate said intake chamber and said outlet chamber;
(g) said check valve having a sealing element disposed within said housing member and engageable with said control member, said sealing element being capable of covering at least a portion of said bypass flow channel, said sealing element being movable relative to said bypass flow channel by said control member, movement of said sealing element is carried out in a manner such that when said sealing element is moved a cross-section of said bypass flow channel covered by said sealing element can be adjusted, said sealing element having at least a portion formed of a resiliently deformable material and being deformable from a sealing position to said open position by a fluid pressure differential across said at least a portion;
(h) wherein said cavity formed in said housing member intermediate said intake chamber and said outlet chamber is a box recess; and
(i) wherein said sealing element is a cup-shaped sealing element, said cup-shaped sealing element is positioned in said box recess in a position so that an open end thereof faces a pressure-medium chamber that links a passage connecting said intake chamber and said outlet chamber.

41. A one-way restrictor, according to claim 40, wherein said check valve is formed by at least a portion of an outer shell surface of said cup-shaped sealing element and said at least a portion of said bypass flow channel being formed by said at least one opening.

42. A one-way restrictor, according to claim 41, wherein an edge of said cup-shaped sealing element that bounds said open end of said cup-shaped sealing element runs, from a point farthest away from a bottom of said cup-shaped sealing element, at an angle toward said bottom of said cup-shaped sealing element.

43. A one-way restrictor, according to claim 42, wherein said cup-shaped sealing element is rotatably connected to said control member about a longitudinal axis thereof so that depending on a position of said cup-shaped sealing element at least one of a portion of said outer shell surface of said cup-shaped sealing element having a greatest side length and a portion having a smaller side length contacts a sealing surface area in an area of said at least one opening thereby changing an open cross-section of said at least one opening.

44. A one-way restrictor, according to claim 40, wherein said cup-shaped sealing element tapers down conically beginning at said open end toward said bottom.

45. A one-way restrictor, according to claim 43, wherein said cup-shaped sealing element tapers down conically beginning at said open end toward said bottom.

46. A one-way restrictor, according to claim 40, wherein said cup-shaped sealing element includes at least one circumferential raised area contacting a wall surface bounding said box recess located beyond an area of said intake chamber and said outlet chamber.

47. A one-way restrictor, according to claim 43, wherein said cup-shaped sealing element includes at least one circumferential raised area contacting a wall surface bounding said box recess located beyond an area of said intake chamber and said outlet chamber.

48. A one-way restrictor, according to claim 44, wherein said cup-shaped sealing element includes at least one circumferential raised area contacting a wall surface bounding said box recess located beyond an area of said intake chamber and said outlet chamber.

49. A one-way restrictor, according to claim 1, wherein said control member includes a knob member secured to one end thereof externally of said housing member to facilitate movement of said control member.

50. A one-way restrictor, according to claim 49, wherein said movement of said control member is in a direction of a longitudinal axis of said control member.

51. A one-way restrictor, according to claim 43, wherein said control member includes a knob member secured to one end thereof externally of said housing member to facilitate movement of said control member.

52. A one-way restrictor, according to claim 51, wherein said movement of said control member is rotational about a longitudinal axis of said control member.

53. A one-way restrictor, according to claim 1, wherein said one-way restrictor further includes a cover member secured to said housing member to close said cavity.

54. A one-way restrictor, according to claim 53, wherein said cover member is removably secured to said housing member.

55. A one-way restrictor, according to claim 40, wherein said one-way restrictor further includes a cover member secured to said housing member to close said box recess.

56. A one-way restrictor, according to claim 55, wherein said cover member is removably secured to said housing member.

57. A one-way restrictor, according to claim 53, wherein said one-way restrictor further includes a sealing means for providing a fluid pressure seal between said cover member and said housing member.

58. A one-way restrictor, according to claim 55, wherein said one-way restrictor further includes a sealing means for providing a fluid pressure seal between said cover member and said housing member.

59. A one-way restrictor, according to claim 57, wherein said one-way restrictor further includes a sealing means for providing a fluid pressure seal between said cover member and said control member.

60. A one-way restrictor, according to claim 59, wherein said one-way restrictor further includes a guide means for guiding said control member in said cover member.

* * * * *

UNITED STATES PATENT AND TRADEMARK OFFICE
CERTIFICATE OF CORRECTION

PATENT NO. : 5,054,517

DATED : October 8, 1991

INVENTOR(S) : THOMAS LIESENHOFF, HANS-FRIEDRICH MEYER, MANFRED SCHMITZ
ERNST-AUGUST MEYER, RUDOLF MOLLER

It is certified that error appears in the above-identified patent and that said Letters Patent is hereby corrected as shown below:

Column 4, line 23, change the first occurrence of "of" to --on--.

Column 4, line 29, change "boltsare" to --bolts are--.

Column 5, line 46, change "threaded" to --unthreaded--.

Column 20, line 14, claim 37, after "further" insert --includes:--.

Column 20, line 35, claim 38, after "further" insert --includes:--.

Column 20, line 55, claim 39, change "opening" to --chamber--.

Column 21, line 14, claim 40, change the second occurrence of "chamber" to --member--.

Column 23, line 5, claim 59, change "57" to --54--.

Signed and Sealed this

Thirtieth Day of March, 1993

Attest:

STEPHEN G. KUNIN

Attesting Officer

Acting Commissioner of Patents and Trademarks